July 12, 1938.  H. ROSENTHAL  2,123,207
COFFEE AND THE TREATMENT THEREOF
Filed Aug. 4, 1934

Henry Rosenthal
INVENTOR

Patented July 12, 1938

2,123,207

UNITED STATES PATENT OFFICE 2,123,207

COFFEE AND THE TREATMENT THEREOF

Henry Rosenthal, New York, N. Y.

Application August 4, 1934, Serial No. 738,404

5 Claims. (Cl. 99—65)

My invention relates to novel apparatus for and methods of preparation of coffee and a novel coffee obtained therefrom and is directed particularly to treating the beans in such a manner that rancidity is substantially limited even after the roasted bean has been ground. This is accomplished by removing the major portion of the oil commonly present, and which causes the rancidity in the coffee when the roasted bean is ground and exposed to the atmosphere.

I have found that when low boiling hydrocarbons are used as a solvent for oil, they exert a preferential solvent action with respect to various oils. Thus, the true fatty oils, which are simple and compound triglycerides, are more readily soluble in low boiling hydrocarbons, such as propane, butane, propylene, butylene, than are oils such as the essential oils.

Thus, when these low boiling hydrocarbons are used as a solvent in removing the oil from the coffee bean, the glycerides are dissolved to a relatively greater extent than are the essential oils. This is of particular advantage as the flavor and odor reside in the essential oils to a much greater extent than they do in the fatty oils. Furthermore, the fatty oils are much more subject to rancidity than are the essential oils.

A further advantage in the use of the low boiling hydrocarbons resides in the fact that these compounds are easily removed from the coffee bean after the extraction has been completed. Furthermore, where the raw coffee bean is used in the extraction, the oil in the solution may be recovered by proper handling of the solution as a clear, light, straw-colored oil which may readily be made suitable for edible purposes.

In order to efficiently extract the oil from the bean, the bean must first be prepared in such a manner that the solvent can reach the oil in the oil cells distributed throughout the bean. Roasted coffee is hard and brittle and must be finely ground if the oil is to be efficiently removed. As this fine grinding may cause packing within the extractor, I prefer to extract the bean prior to roasting, but I do not so limit this invention.

The raw coffee bean is relatively soft and tough and can be converted into large thin flakes by proper rolling operations. These flakes provide a free open bed within the extractor which is easily handled in any form of extractor. Moreover, if the final rolling step is conducted, using differential rolls, that is, a pair of rolls in which one of the pair moves at a different peripheral speed than the other roller of the pair, the cells of the bean are quite fully disrupted. The flakes produced by this rolling operation may therefore be readily extracted and the oil removed therefrom. This preparation of the bean is a further advantage in the final use of the bean, as the open structure of the cells maintains through the roasting process, which aids the extraction of the essence of the roasted bean in the preparation of the coffee beverage.

After the extraction I prefer that heat be applied to the extracted bean within the extractor and that the solvent vapors which emanate be substantially completely removed from the bean in the extractor before discharging the extractor. In this manner any risk that may be present through the use of an inflammable solvent is greatly reduced. This solvent freed extracted bean may be delivered directly to the roaster. The roasting temperatures will preclude even the faintest trace of solvent remaining, when the solvent is a low boiling hydrocarbon. The rolled beans are relatively light and flaky as compared with the bean as commonly used in a roaster, and in order to prevent burning of the flakes, they must be kept in the roaster for much shorter periods than are commonly used in the roasting of the whole bean. Moreover, somewhat higher roasting temperatures may be used and still secure uniform roasting, due to the particular form of the prepared bean.

While I prefer to treat the raw coffee, I can treat the roasted bean. In this case, due to the brittle condition of the roasted bean, it must be ground rather than rolled, to prepare it for the extraction. The roasting process, moreover, chemically changes the content of the coffee. It makes the essential oils somewhat more readily extractible, and the crude oil produced from the extraction is a dark coffee-colored oil as compared to the pale straw-colored crude oil extracted from the raw bean.

The extractor which I prefer and the method of its operation together with the preferred means of removing solvent from the solution and from the extracted bean, is described and claimed in my co-pending application, entitled "Oil Extraction", Serial No. 738,400, filed coincidentally with this application and of which this application has subject matter in common. However, I do not limit my invention to any particular form of extractor, or to any particular method of solvent removal.

The objects of my invention are:

1. To prepare a roasted coffee that is less easily deteriorated by rancidity than is the usual ground roasted bean.

2. To prepare a roasted coffee that lends itself to the extraction of the beverage.

3. To the securing of an edible oil as a by-product.

Other objects of my invention are apparent from these specifications.

My invention may best be described by reference to the accompanying drawing which forms a part of this specification. In the drawing.

In the figures, like numbers refer to like parts.

Figure 1:
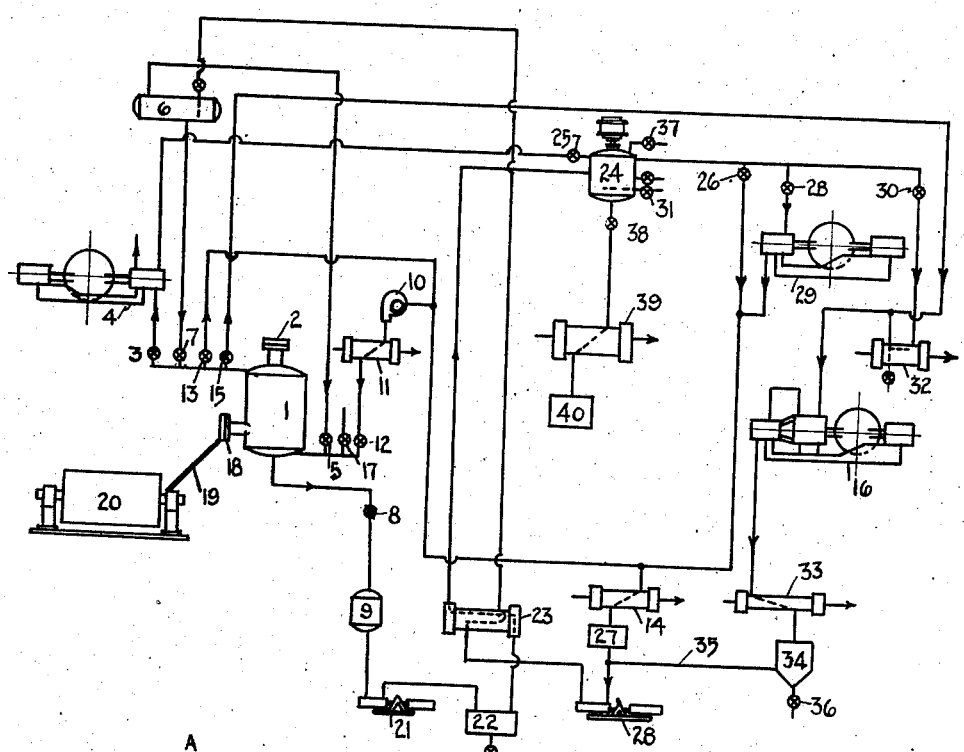
Figure 1 is a diagrammatic layout of one embodiment of my invention.

Referring to Figure 1, the prepared beans are delivered to the extractor 1, through the inlet opening 2; the inlet is then sealed and the extractor is evacuated by opening valve 3 to the vacuum pump 4. When a suitable vacuum is obtained within the extractor, valve 3 is closed and valve 5 is opened, allowing vapors from solvent storage tank 6 to enter below the bed of prepared beans to break the vacuum within the extractor 1, and to equalize the pressure of the extractor with that of the solvent tank 6. Valve 5 is then closed, and valve 7 is opened, allowing the liquid solvent to enter the extractor. At this point the operation may be conducted in one of two ways. In one manner valve 7 may be closed and the solvent allowed to stand in contact with the bean for a predetermined time after which valve 8 is opened, allowing the solution to drain to the tank 9. After the solution has drained from the bean, valve 8 is closed and valve 7 is opened whereby the beans within the extractor 1 are again submerged in solvent with which they are allowed to remain in contact for a second predetermined period, after which the extractor is again drained to tank 9. This operation may be repeated as required to obtain the proper degree of extraction. I find that where the beans have been properly prepared, two, or at most three charges of solvent are sufficient to properly extract the beans.

An alternate method of operation is to keep valve 7 open so that solvent will continually fill the extractor until the extraction is completed, allowing valve 8 to remain partially open. In this manner, solvent enters the top of the extractor and gradually works through the bed of prepared beans and is discharged through valve 8 to the tank 9. After a sufficient amount of solvent has been delivered to the extractor, valve 7 is then closed and the extractor allowed to drain through valve 8 into the tank 9.

When the extractor is substantially completely drained of solution, valve 8 is closed, and superheated solvent vapors are introduced below the bed within the extractor by means of the blower 10, discharging through the superheater 11 and the valve 12. These superheated vapors, passing through the bed of beans retained within the extractor, vaporize the solvent still associated with the beans after draining, and together with the vapors thus produced within the extractor are discharged through valve 13, from which a portion are returned to the blower 10 and the excess vapors are discharged to the condenser 14. When the solvent associated with the drained beans has been completely evaporated as may be determined by a rise in temperature of the vapors leaving the extractor through valve 13, valves 12 and 13 are closed and valve 15 is opened, which places the extractor in communication with the exhauster 16, which withdraws the vapors within the extractor and produces a high vacuum within the extractor. Valve 15 is then closed and valve 17 is opened, allowing air to enter the extractor from below the bed and equalize the pressure within the extractor with that of the atmosphere. Outlet 18 may then be opened, allowing the extracted beans to be discharged from the extractor and delivered by chute 19 to the roaster 20 where they are handled in the usual manner, except that slightly higher temperatures than usual are maintained within the roaster and that the beans are kept within the roaster for a shorter period than is usually the case.

Now referring to the solution which was delivered from the extractor 1 to the tank 9, this solution is transferred by the pump 21 through the filter 22 and the heat exchanger 23 to the still 24 which may have been previously exhausted and placed under a vacuum by opening valve 25 which places the still 24 in communication with the vacuum pump 4. This valve 25 should be closed before admitting the solvent from tank 9 to the still 24. Heat is applied to the solution within the still, and valve 26 which places the still in communication with condenser 14 is opened.

The vapors thus generated within the still are conducted to the condenser 14 where they are converted into the liquid phase and the liquid is delivered to the tank 27, from which it is withdrawn by means of the pump 28 and returned through the heat exchanger 23 to the solvent tank 6. After the solvent has been treated in this manner until substantially no more vapors are released from the solution, with the pressure in the still maintained substantially at that of condenser 14, valve 26 is closed.

Valve 28 is then opened which places the still in communication with the exhauster 29 which maintains some predetermined pressure within the still and compresses the vapors withdrawn from the still to a value in excess of the pressure within the condenser 14. These compressed vapors are returned to the condenser where they are condensed and delivered to the solvent tank 27 from which they are handled in the manner hereinbefore described. After no further vapors can be withdrawn from the still under these conditions, valve 28 is closed. The still may then be placed in communication with the exhauster 16 by opening valve 30 which is so proportioned that it can place a vacuum upon the still 24.

Open steam, preferably superheated, may be admitted to the still by means of valve 31. Where this open steam is used, a substantial portion of it will be condensed in condenser 32 through which the vapors from still 24 pass on their way to the exhauster 16. The vapors are compressed by means of exhauster 16 and delivered to the condenser 33, the condensate from which passes to the separator 34. Solvent from the separator 34 is conveyed by pipe 35 to the pump 28, which delivers it back to the solvent tank 6 in the manner hereinbefore described. Water condensed by means of the condenser 33 is withdrawn from the bottom of the separator 34 by means of the valve 36. When this operation is complete, and has been properly conducted, the extract within the still 24 should be free from all traces of solvent. Valve 30 is then closed.

The extract is withdrawn from still 24 by first opening valve 37 which equalizes the pressure within the still with that of the atmosphere. Valve 38 is then opened and the extract passes from the bottom of the still through the oil cooler 39 to the oil storage tank 40, which completes the operation.

Figure 2:
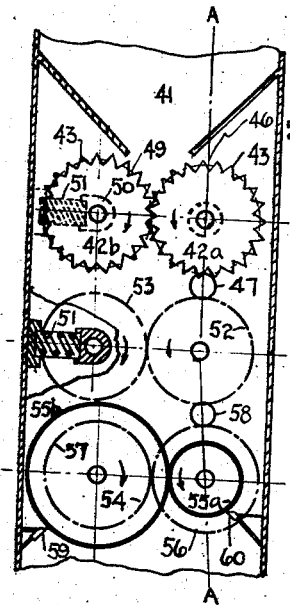
Figure 2 is an elevation, partly in section, showing the roll train which I prefer using for preparing the coffee bean prior to the extraction.
Figure 3:
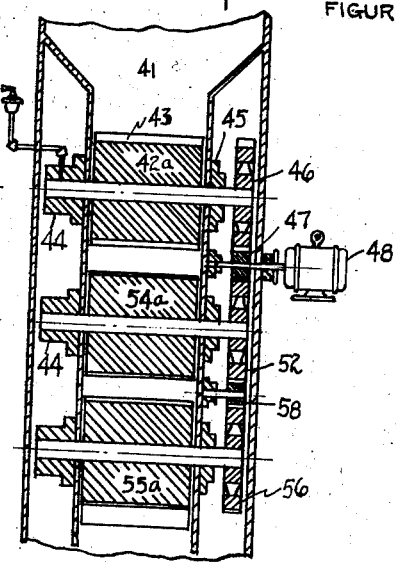
Figure 3 is a cross section of Figure 2 on the line AA.

Now referring to Figures 2 and 3 which show the method which I prefer for the preparation of the coffee beans prior to their delivery to the extractor 1, the green beans are delivered to the hopper 41 from which they are fed to a pair of rollers 42—a and 42—b. These rollers are serrated and are provided with the interlocking teeth 43, which should preferably be approximately a quarter of an inch in height. The roll 42—a is mounted in the fixed bearings 44 and 45 and is driven by the gear 46, which in turn is driven by the pinion 47, connected with the motor 48. The gear 46 on the shaft of the roller 42—a meshes with a gear 49 of similar size which drives the roller 42—b. The roller 42—b is mounted in a pair of bearings 50, (shown in Figure 2) which bearings are supported by the springs 51 which permit movement of the roller 42—b relative to the roller 42—a. The roller 42—b rotates clockwise and 42—a counter-clockwise, as shown in Figure 2, and in delivering the beans from the hopper 51 to a similar pair of rollers immediately below them, exerts a cutting and crimping action upon the beans. Immediately below rolls 42—a and 42—b are a similar set of rolls driven by the gears 52 and 53. These rolls, 54—a and 54—b, are of similar construction to rolls 42—a and 42—b just described, except that the serrated teeth should be only about ⅛ of an inch in height and the rolls should be set somewhat closer than are the pair 42—a and 42—b. The gear 52 is driven by the motor pinion 47, and the rolls 54—a and 54—b are mounted similarly to the rolls 42—a and 42—b, and rotate in the same direction. They thus deliver the beans discharged from the upper set of rolls to a set of crushing rolls placed immediately below them.

These crushing rolls, 55—a and 55—b, are driven respectively by the gears 56 and 57. These gears are of similar size and mesh with each other, the gear 57 being driven by the gear 56 and the gear 56 being driven by the pinion 58 from the gear 52. The gears 56 and 57 being of similar size and one being driven by the other, the rolls 55—a and 55—b operate at the same rotational speed, but as roll 55—b is of larger diameter than roll 55a, their peripheral speeds are different so that they set up a tearing action upon the seeds passing through them, as well as exerting a crushing action. Both rolls 55—a and 55—b should have a roughened surface which is preferably a longitudinal milling about 1/64th of an inch deep. Without this milling on at least one of these crushing rolls, the crimped beans will not feed through the crushing rolls, if these latter rolls are set together close enough to exert the proper crushing action. Rolls 55—a and 55—b are mounted in a manner similar to the other pairs of rolls, as previously described. The scrapers 59 and 60, with their edges set in close proximity to either roll, and preferably mounted along the radius of either roll, scrape from the rolls any material that may adhere thereto. Little of the material will tend to adhere to the smaller roll 55—a, but a considerable amount will tend to adhere to the larger roll 55—b. The scraper 60 may therefore be omitted, but the scraper 59 is essential for proper operation. The material discharged by the crushing rolls may be delivered to the extractor by any suitable means.

Many changes may be made in the details of my invention without departing from the spirit of my invention, and I do not limit myself to the particular form shown.

Having described my invention so that it may be readily understood by one skilled in the art, I claim:

1. The method of preparing coffee which comprises first crimping and rolling the raw coffee beans whereby the beans are reduced to thin, shredded, easily extractible flakes, then subjecting said flakes to a hydrocarbon solvent, gaseous at normal temperatures and pressure, maintaining said solvent in the liquid phase while in contact with said flakes, withdrawing the solution, and applying heat to the flakes, whereby there is produced a substantially solvent free coffee flake from which the fatty oil content has been largely removed.

2. The method of preparing coffee which comprises first crimping and rolling the raw coffee beans, then subjecting the rolled beans to a hydrocarbon solvent, gaseous at normal temperatures and pressure, maintaining said solvent in the liquid phase while in contact with the rolled beans, withdrawing the solution, separating the solvent from the extracted beans and then roasting said beans.

3. In the process of preparing coffee, the step which comprises flaking the raw beans by first passing the coffee through crimping rolls and then through crushing rolls.

4. In the process of preparing coffee, the steps which comprise passing the raw coffee beans first through a pair of crimping rollers and then through a pair of differential speed crushing rollers, whereby the beans are reduced to thin, easily extractible flakes.

5. In the process of preparing coffee, the steps which comprise first passing the coffee through crimping rolls and then passing the coffee through milled differential rolls, whereby there is produced shredded coffee flakes in which the cellular structure is disrupted by mechanical shearing action.

HENRY ROSENTHAL.